United States Patent
Perkins et al.

(10) Patent No.: US 6,642,682 B1
(45) Date of Patent: Nov. 4, 2003

(54) CIRCUITS AND METHODS FOR PREHEATING A ROTOR OF A MOTOR-GENERATOR DEVICE

(75) Inventors: David E. Perkins, Austin, TX (US); Charles S. Richey, Round Rock, TX (US)

(73) Assignee: Active Power Inc., Austin, TX (US)

( * ) Notice: Subject to any disclaimer, the term of this patent is extended or adjusted under 35 U.S.C. 154(b) by 46 days.

(21) Appl. No.: 10/082,542

(22) Filed: Feb. 21, 2002

(51) Int. Cl.$^7$ .............................................. G05D 23/00
(52) U.S. Cl. ...................................... 318/436; 318/471
(58) Field of Search ................................ 318/140, 159, 318/436, 471, 480

(56) References Cited

U.S. PATENT DOCUMENTS

| | | | | |
|---|---|---|---|---|
| 3,582,712 A | * | 6/1971 | Blair ........................ 318/436 X |
| 3,717,804 A | * | 2/1973 | Dikinis et al. ............... 318/436 |
| 4,135,122 A | * | 1/1979 | Holmquist et al. .......... 318/436 |
| 4,638,643 A | * | 1/1987 | Sakazume et al. ....... 318/436 X |
| 4,776,529 A | | 10/1988 | Tanis ........................... 244/1 R |
| 4,808,896 A | * | 2/1989 | Katsuragi et al. ............ 318/436 |
| 5,048,753 A | | 9/1991 | Kellie ..................... 237/12.3 C |
| 5,050,545 A | | 9/1991 | Shirata et al. ........... 123/179 H |
| 5,108,699 A | | 4/1992 | Bodnar et al. ............... 420/109 |
| 5,196,673 A | | 3/1993 | Tanis ........................... 219/205 |
| 5,232,285 A | | 8/1993 | Mannik ....................... 374/131 |
| 5,257,863 A | | 11/1993 | Chu et al. ................... 374/153 |
| 5,469,819 A | | 11/1995 | Berger et al. ............. 123/179.6 |
| 5,896,021 A | * | 4/1999 | Kumar ........................ 318/775 |
| 5,969,457 A | | 10/1999 | Clifton et al. .............. 310/216 |

\* cited by examiner

Primary Examiner—Bentsu Ro
(74) Attorney, Agent, or Firm—Fish & Neave; Andrew Van Court

(57) ABSTRACT

The motor-generator circuitry of a flywheel energy conversion device can be utilized to preheat the rotor of the flywheel device. It may be desirable to preheat the rotor prior to normal operation because a rotor operating in cold temperature may be more susceptible to brittle fracture or other damage than a rotor operating at a specified operating temperature. The present invention may utilize the principle of induction heating to preheat the rotor. In preferred embodiments, high frequency current may be passed through armature windings of the motor-generating circuitry to induce surface currents into the periphery of the rotor. Heat may then be generated in portions of the rotor receiving the induced currents and then radiate from those portions to raise the rotor temperature to a desired level.

26 Claims, 7 Drawing Sheets

CIRCUITS AND METHODS FOR PREHEATING A ROTOR OF A MOTOR-GENERATOR DEVICE

BACKGROUND OF THE INVENTION

The present invention relates to flywheel energy conversion devices that include motor-generators and methods for heating rotors using the circuitry of the flywheel energy conversion devices.

Motor-generator systems typically use some type of rotor to incite motoring or energy generating action. For example, a rotor may be used in an automobile alternator to provide electrical power to the car's electrical system. Other applications may include using the rotor in a motoring function to drive, for example, a power drill. An example of a large scale application may involve rotating a rotor with a prime mover such as steam-driven turbine of a nuclear facility to generate electricity for a utility power grid. Yet another example may include rotors that are used in flywheel energy conversion devices such as that described in Clifton et al. U.S. Pat. 5,969,457 ('457 patent), which is hereby incorporated by reference in its entirety.

Each of the rotors described above may exhibit material properties that require specific operating temperatures to operate safely. For example, rotors in flywheel devices may require an operating temperature of at least 15° C. before normal operation can commence. Therefore, to ensure safe operation of the rotor, the temperature of the rotor should be greater than a specified temperature to provide a substantial margin of safety against brittle fractures. (The specified temperature may be dictated by the material properties of the rotor itself, in that the impact energy of metallic materials is a non-linear function of temperature. It is also known that some material strength properties (e.g., impact energy and fracture toughness) are hampered when the temperature of the material is low. But the same material may exhibit resilient strength properties at higher temperatures.) If a rotor is forced to spin at a relatively high speed when its temperature is below a specified value, the stresses due to rotation may cause the rotor to shatter, crack, or experience brittle fracture.

Various preheating techniques have been applied to motor-generator applications to ensure that the rotor operates in a preferred operating temperature regime. For example, the process of preheating a rotor of a 500,000 VA generator is described as follows. In this example, steam may be used to transfer heat to the rotor and other associated components (e.g., turbine disks) by convective means. Initially, a limited quantity of steam may be introduced to gradually warm the rotor. Then, in controlled increments, greater quantities of steam may be applied to steadily raise the temperature of the rotor to a desired level. The heating process may progress over a period of several hours to several days, but is necessary to prevent potential damage that can be caused by changing temperature gradients that can inflict thermal stresses on the rotor. This heating process may be problematic because it is cumbersome, time consuming, and requires an external source of heat (e.g., steam) to raise the rotor temperature. Once the heating process is complete, however, the rotor is in condition to safely generate power.

Other known preheating methods have been used for preheating devices such as engines. For example, preheating an engine may involve installing heater coils strategically around vital parts of the engine. Power may be provided to heater coils so that they radiate heat to the engine via convective or conductive means. Eventually, this radiated heat may preheat the engine to a specified temperature prior to ignition. But this method requires the addition of external components (i.e., heater coils) to enable the preheating process.

In view of the foregoing, it is an object of this invention to preheat the rotor of a flywheel energy device prior to normal use.

It is a further object of this invention to preheat the rotor to obtain a substantially high margin of safety against brittle fracture or other damage.

It is also an object of this invention to use the circuitry of the flywheel energy device to preheat the rotor prior to normal use.

SUMMARY OF THE INVENTION

These and other objects of the present invention are accomplished in accordance with the principles of the invention by preheating the rotor of a flywheel energy conversion device prior to use. In preferred embodiments, the rotor may be preheated using the circuitry provided with the flywheel device. Such circuitry may include armature windings, field coil windings, electronics (including software), temperature sensors and other suitable features of the flywheel device.

The rotor is preferably preheated prior to use to provide a reasonable margin of safety that protects the rotor from incurring brittle fractures. Since brittle fractures are more likely to occur at lower temperatures, the present invention may implement several techniques to raise the rotor temperature to a safe operating level. These problems are particularly relevant when the temperature is below a specific transition temperature, which is dictated by the material properties of the rotor. This may be advantageous because it enables a flywheel device to operate in sub-zero arctic temperatures.

The present invention may utilize convective and radiative methods to heat the rotor. Convective methods are particularly useful if the rotor is not operating in vacuum conditions. An example of using this method may involve heating the field coils by passing current through them. As the current flows through the coils, they generate heat, and that heat may be transferred to the rotor via air, which serves as a heat transfer medium. After time, the convected heat may eventually raise the temperature of the rotor to the desired level.

In another embodiment, a method of radiative heating may be used. This technique utilizes high frequency magnetic induction to heat to the rotor. This may be advantageous because heat can be conveyed directly to the rotor without requiring any physical application of a device (e.g., heat iron) to the rotor. A further advantage of this technique is that the circuitry of the flywheel device can be used to induce the heat energy to the rotor. This eliminates the need for additional equipment to perform the heating process. In addition, heat may be imparted onto a rotor operating in a vacuum, an environment where convective methods cannot be employed.

Using the circuitry of the flywheel device, induction heating may be provided as follows: 1) provide a high frequency current (produced by flywheel device electronics) to the armature windings; 2) use the high frequency current to generates flux, which passes through the rotor; 3) induce currents in portions of the rotor where the flux passes through; and 4) generate heat from the induced current to raise the rotor temperature.

The induction heating process may be a single process or it may be separated into a preheating step and a settling step. During the preheating step, high frequency currents are continuously applied to the armature windings. It is during this step in which certain portions (e.g., toothed protrusions) of the rotor are constantly subjected to induced currents. Since these portions are constantly receiving induced currents, they may be heated to relatively high temperatures, whereas the rotor core, which does not have induced currents, may remain relatively cool.

Since heat may continue to flow from the inductively heated portions even after cessation of high frequency currents, it may be useful to transition from the preheating step to the settling step to avoid potentially overheating the flywheel device (e.g., the armature windings or rotor surface). The settling step may provide time for surface heat of the rotor to diffuse and fully penetrate the rotor such that the desired temperature is provided substantially throughout the rotor.

The present invention may also use different techniques to determine whether the rotor requires heating prior to use. Both indirect and direct rotor temperature measurements may be performed (either individually or in combination with each other). The indirect method may include monitoring the temperature of the stator (e.g., armature winding), outer casing, or some other portion of the flywheel device to obtain an approximate temperature of the rotor. If the monitored temperature is too low, then the electronics may determine how long to heat the rotor to obtain a desired temperature. If the induction heating technique is used, then the electronics may determine the preheating and settling time needed to safely heat the rotor.

If direct rotor temperature measurement is implemented, a device such as an infrared detector may be positioned within the flywheel to monitor rotor temperatures directly. The infrared detector may provide substantially accurate rotor temperatures, which may enable the electronics to more optimally heat the rotor by minimizing heating times and reducing risk of overheating the flywheel device.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention relates to preheating a rotor of a motor-generator device, and more particularly, to preheating the rotor of a flywheel energy conversion device.

Motor-generator devices are known and have been utilized in several different applications. For example, motor-generator devices are used in electrical generation facilities, automobiles (e.g., the alternator), uninterruptible power supply ("UPS") systems, and other suitable applications. Motor-generator devices, in accordance with the principles of the present invention, are primarily described in context with UPS systems. For example, the '457 patent describes a UPS system that implements a motor-generator device.

Figure 1:
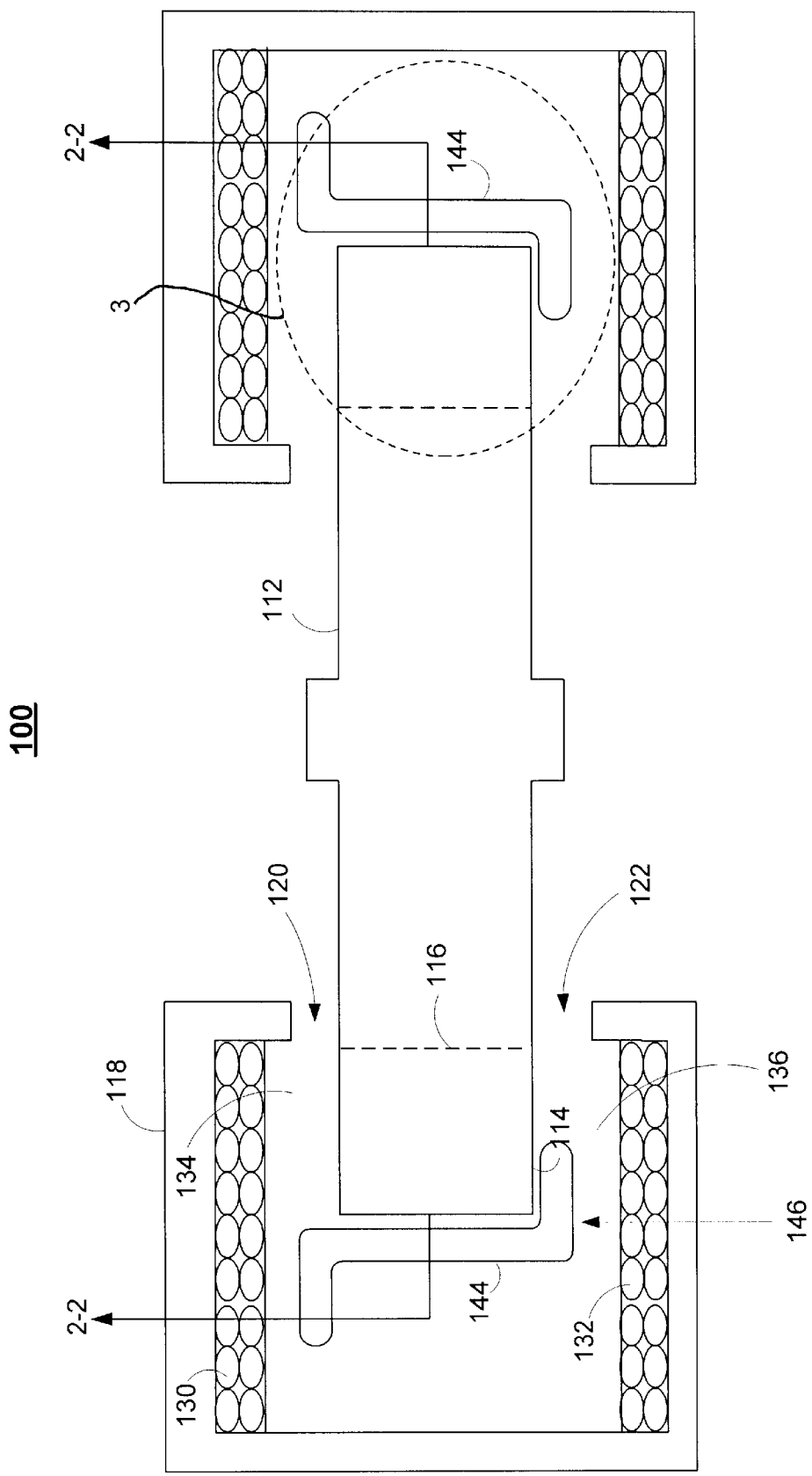
FIG. 1 illustrates a cross-sectional view of an energy flywheel device constructed in accordance with the principles of the present invention.
Figure 2:
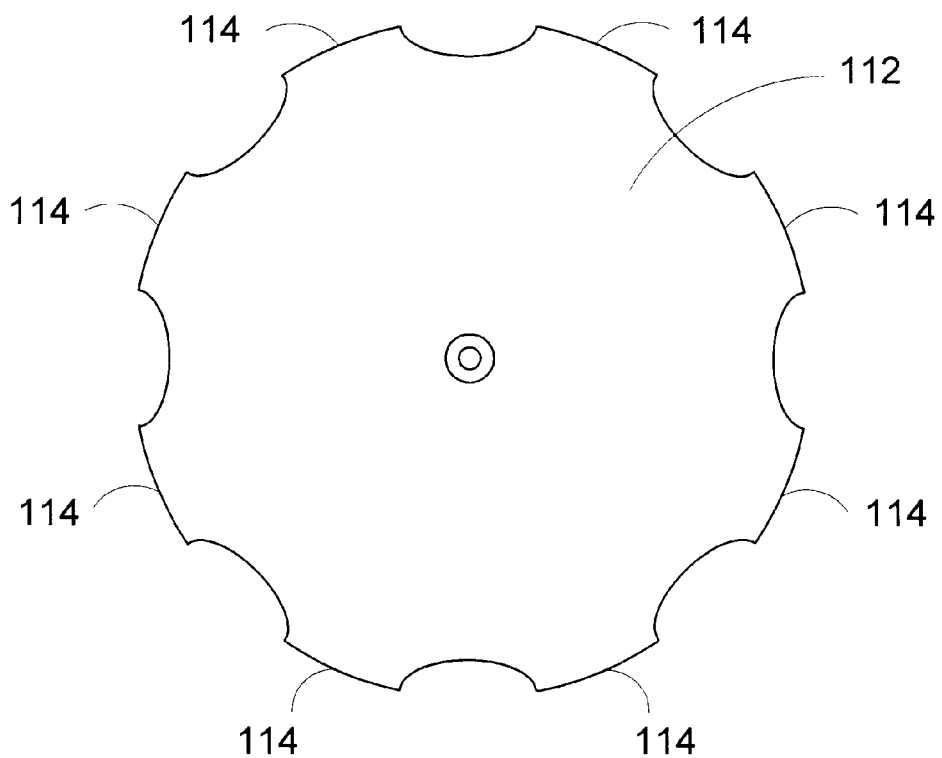
FIG. 2 illustrates a top view of the rotor of the energy flywheel device of FIG. 1, taken from line 2—2 of FIG. 1.

FIG. 1 illustrates a cross-sectional view of motor-generator device 100 which is in accordance with the principles of the present invention. Device 100 may include rotor 112 which has teeth 114 cut out of a portion of the outer circumference of rotor 112. Teeth 114 are delineated by dashed lines 116 in FIG. 1, and may be more apparent from viewing FIG. 2, in which a top view of rotor 112, taken along line 2—2 is shown. Rotor 112 is shown be to be encased by outer casing 118, which is preferably constructed from a magnetically permeable and electrically conductive material such as steel. Outer casing 118 may be constructed such that air gaps 120 and 122 exist between rotor 112 and outer casing 118. Also shown in device 100 are upper and lower field coils 130 and 132 respectively. Upper and lower field coils 130 and 132 may be wound in device 100 such that air gaps 134 and 136 exist between rotor 112 and field coils 130 and 132 respectively.

FIG. 1 also illustrates that several armature coils 144 are disposed around the periphery of rotor 112 such that air gap 146 is formed between armature coils 144 and rotor 112. Armature coils 144 may be coupled to electronics (not shown in FIG. 1; see FIG. 3) that can provide power to (e.g., for motoring function) or receive power from armature coils 144 (e.g., for drawing energy from the rotating rotor). In the present invention, armature coils 144 may be used for conducting time-varying currents, that in turn, induce currents in rotor 112, which cause the temperature of the rotor to rise. Persons skilled in the art will appreciate that the above discussion with respect to FIG. 1 is not intended to be an exhaustive description of various features that can be included in motor-generator device 100. It does, however, discuss many of the various features pertinent to describing the present invention. The '457 patent, for example, provides a substantial description of motor-generator device 100 and other similar motor-generator devices.

Using device 100 as described above, the present invention may be able to heat rotor 112 to a specified temperature prior to the occurrence of normal operations. Normal operation of device 100 may include spinning rotor 112 at a substantially high number of revolutions per minute in order to store enough energy in the spinning rotor to provide backup power for a sustained period of time. Heating rotor 112 may be accomplished by using one of several different techniques. Rotor 112 may be preheated by convection, electromagnetic radiation, or a combination of both. At this temperature, the rotor temperature may be within a reasonable margin of safety that guards against brittle fracture.

If a convection technique is used, and assuming that there is no vacuum applied to device 100, then the air surrounding rotor 112 serves as the medium for heat transfer. Since air is the heat transfer medium, heat may be transferred to the rotor from other portions of device 100. For example, current may be applied to field coils 130 and 132, which are heated by the flowing current. When field coils 130 and 132 heat up, they may transfer heat to rotor 112 via the heat transfer medium. Another example may involve blowing hot air into outer casing 118 to heat rotor 112. These different convective heating techniques may be able to heat rotor 112 to a specified temperature, but may require too much time to achieve the desired rotor temperature or additional costly equipment.

Various factors may contribute to lengthy rotor heat times using convective methods. One factor that may dictate the rate of heat transfer may be a convection heat transfer coefficient that exists at the surface of rotor 112. Other factors that may affect the rate of heat transfer is the temperature of outer casing 118, the ambient temperature external to device 100, the surface area of rotor 112, etc. The combination of these factors may result in a temperature versus time relationship that is exponential. That is for each temperature unit (e.g., one degree centigrade) increase, it takes exponentially more time for the temperature of rotor 112 to rise that additional unit. Therefore, the convection technique may require a substantial period of time to heat rotor 112 to a specified temperature.

The radiative technique, on the other hand, may raise the temperature of rotor 112 at a faster rate than the above-mentioned convection technique. Using this technique, heat is induced in portions of rotor 112 by magnetic induction heating and conducted throughout the medium of the rotor to increase the rotor temperature. This may be accomplished by passing high frequency currents through armature coils 144 to induce high surface currents in the periphery of rotor 112 via magnetic induction. These surface currents are primarily responsible for causing the rotor temperature to rise. (A more detailed description of the induction heating process is discussed below in conjunction with FIG. 3.) One particular advantage of this technique is that it can be performed in vacuum. In fact, the efficiency of the heating process may be enhanced if it is performed in vacuum because heat loss paths are substantially reduced. Therefore, this technique requires less time to achieve the specified rotor temperature.

Using this technique, the rate of heat transfer is approximately proportional to the level of current applied to armature coils 144. Electronics (not shown) may be used to prevent excessive application of currents so that device 100 is not damaged by the heating current (e.g., by overheating armature coils 144 or rotor 112). Although the temperature versus time profile is exponential, this technique operates in the substantially linear portion of the temperature profile. This may allow the rotor to heat at a faster rate per unit of time than the convection technique.

Figure 3:
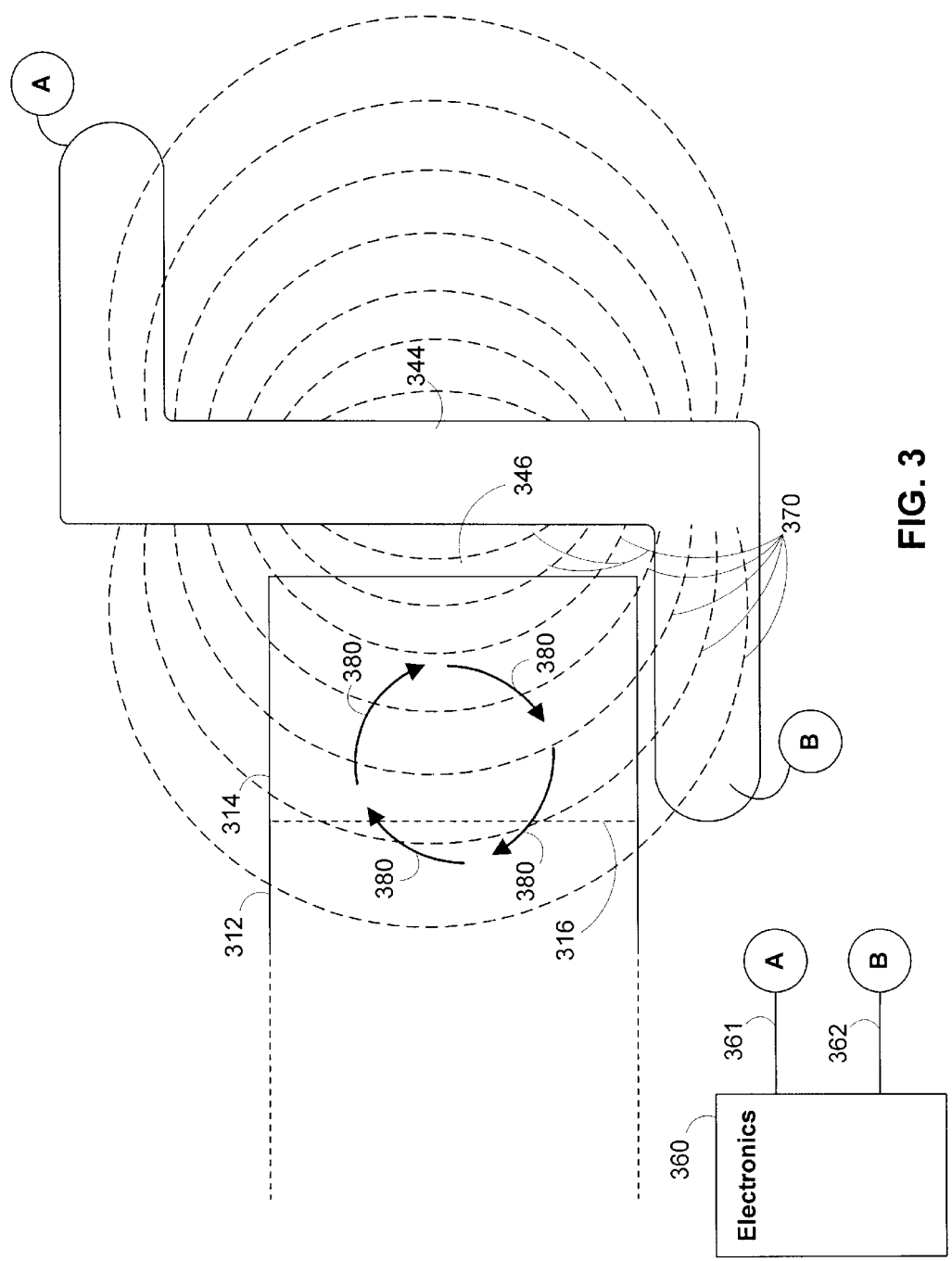
FIG. 3 illustrates an enlarged version of a portion of FIG. 1 that shows flux lines and induced currents in accordance with the principles of the present invention, taken from circle 3 of FIG. 1.

FIG. 3 illustrates an enlarged view of the rotor and armature assembly encircled with dashed line "3" in FIG. 1, in accordance with the principles of the present invention. Though not shown in FIG. 1, electronics 360 is illustratively shown to be connected to armature 344 via lines 361 and 362 in FIG. 3. Electronics 360 may include circuitry such as a DC pulse width modulation ("PWM") converter that is capable of converting supply power to a high frequency PWM signal (e.g., 3 kHz signal). Using a three phase supply, the high frequency PWM signal may generate a relatively high speed rotating magnetic field that induces current in portions of rotor 312. Persons skilled in the art will appreciate that other circuitry such as, for example, an AC cycloverter circuitry and a DC-AC inverter circuitry may be used in electronics 360.

Current may be induced asynchronously in the rotor because the rotational speed of the magnetic field is rotating several times that of rotor 312 during induction heating. There may, however, be enough induced torque (reluctance torque) to cause rotor 312 to rotate up to as much as 100 RPM. In the event that rotor 312 does begin to spin too fast, electronics 360 may detect the potential over-speed condition and take appropriate action to reduce the rotor's speed.

Alternatively, the high frequency PWM signal may be applied to only one phase of the three phase armature winding. In this case, there will be no rotation of the magnetic field and substantially no possibility for rotor rotation. However, the magnetic field orientation may not be optimally disposed in proximity to the salient rotor poles to maximize inductive heat input for repeatable heating times.

When the high frequency PWM signal is applied to armature 344, the time-varying current generates flux as illustrated by flux lines 370. As the flux emanates from armature 344 it may pass through air gap 346 into rotor 312. When the flux reaches rotor 312 it may induce current 380 on the surface of the rotor. Current 380 is sometimes referred to as eddy current. Typically, eddy currents are considered undesirable during normal operation of the motor/generator system because they represent heat loss and inefficiency. But in the present invention, such currents are purposefully induced to produce the desired effect—heating rotor 312. As described above, a high concentration of current 380 is induced in the periphery of rotor 312. In particular, the majority of current 380 may be induced in teeth 314 (delineated by dashed lines 316) and a smaller subset of current 380 may be induced in rotor portions located between teeth 314 (such portions are clearly shown in FIG. 2). Thus during the heating process, the portions of rotor 312 conducting the induced current may induce a relatively high temperature (e.g., 200° C.) that diffuses throughout the rotor.

Figure 4:
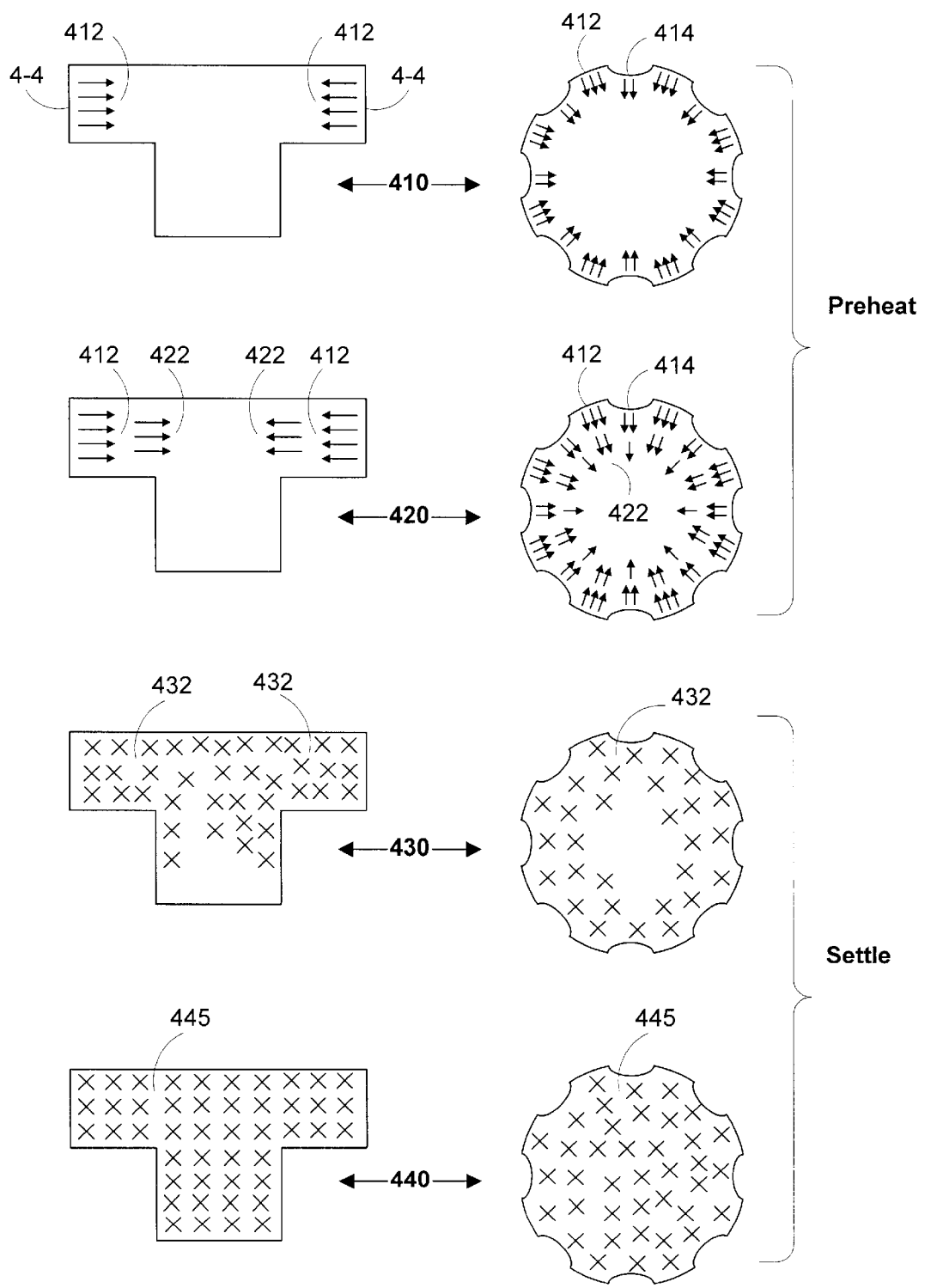
FIG. 4 shows several steps illustrating various stages of heat distribution throughout the rotor in accordance with the principles of the present invention.

FIG. 4 illustrates several steps of heat distribution throughout the rotor in accordance with the principles of the present invention. The process of heating the rotor may involve a preheating step and a settling step. Both steps are described below in conjunction with illustrative cross-sectional views and top views taken along line 4—4 of the cross-sectional views of the rotor. Step 410 illustrates the beginning of the preheating cycle by showing that heat 412 is concentrated primarily in the toothed portions of the rotor. Step 410 also shows heat 414 disposed along the peripheral edge of the rotor existing between the protrusions. Finally, step 410 also illustrates that there is substantially less heat 414 induced in the rotor than heat 412.

Step 420 illustrates the diffusion of heat 422 as it is conducted away from constantly induced heat 412 and 414. In this step, high frequency current is still being applied to the armature coils (not shown) while heat 412 and 414 is still being produced by the induced current. After a predetermined period of time or based on other calculations or based on direct or indirect measurement, the electronics (not shown in FIG. 3) may stop applying the high frequency current to end the preheating step and begin the settling step. Hence, when the high frequency currents cease being applied to the armature coils, heat is no longer induced in the rotor in this manner.

The settling step provides adequate time for the heat previously induced into the rotor during the preheating step to be relatively evenly distributed within the rotor. The settling step may also prevent the flywheel device (e.g., armature, rotor, outer casing, etc.) from overheating. For example, the induced heat at the rotor surface may cause the rotor surface temperature to rise at a rate appreciably faster than the center of the rotor where, upon rotation, the stresses and probability of brittle fracture would be the highest. By applying the heat in a controlled duty-cycle consisting of alternating between the on-state with heat generation, and the off-state with conductive diffusion (settling step), the time-average temperature difference between the rotor surface and the rotor center may be minimized thus reducing the risk of overheating the rotor surface. Similarly, conductive losses within the armature may cause the armature to heat faster than the center of the rotor and the settling step may be used to limit the temperature rise in the armature.

As shown in settling step 430, heat 412 and 414 are no longer being induced in the rotor, but residual heat 432 existing in the rotor may continue to diffuse. Step 440 illustrates that heat 445 is now distributed substantially uniformly throughout the rotor. At this point the settling step is complete and the rotor may be in a condition suitable for normal usage.

The duration of time required for the preheating and settling steps may depend on a number of factors. Some factors may include, for example, initial temperature of the rotor, ambient temperature, construction of the rotor, whether a vacuum is in use, etc. Based on these and other factors, a software program may be able to determine how much time is required for the preheating and settling steps. Such a software program may be included as part of the electronics associated with the flywheel device. The versatile nature of software is advantageous for the present invention because it enables the device to safely heat the rotor regardless of the construction and material properties of the motor-generator device.

Figure 5:
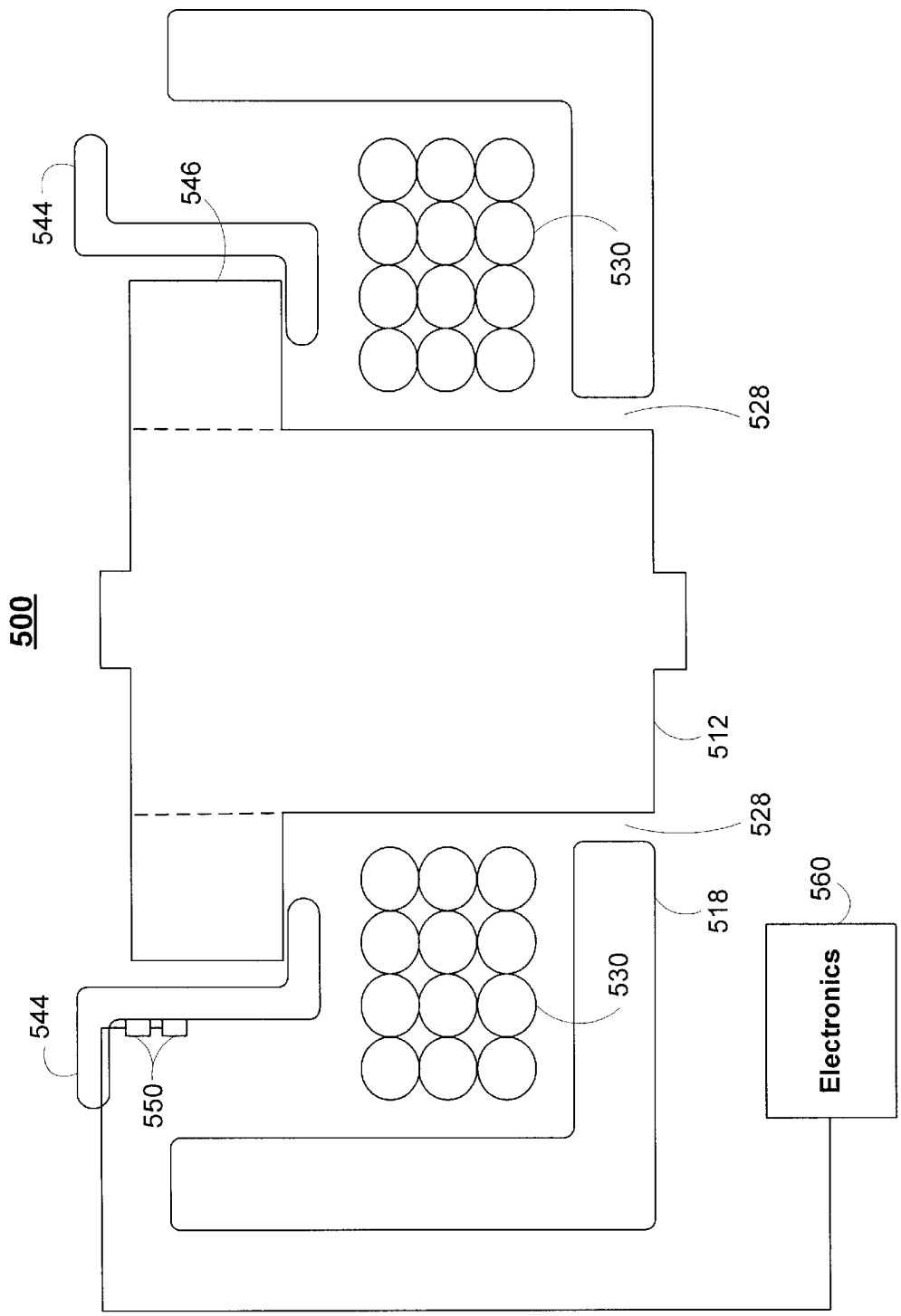
FIG. 5 illustrates a thermocouple device configured to monitor the temperature of the armature in accordance with the principles of the present invention.

FIG. 5 illustrates thermocouple device 550 that can be used to provide temperature data to electronics 560 in accordance with the principles of the present invention. FIG. 5 also illustrates flywheel device 500 that includes rotor 512, outer casing 518, field coils 530 and armature 544, all of which are constructed similar to motor-generator device 100 of FIG. 1. In addition, device 500 may be constructed such that air gap 528 exists between rotor 512 and outer casing 518, and airgap 546 exists between rotor 512 and armature 544. Thermocouple device 550 may be coupled to armature 544 so that the temperature of armature 544 can be monitored directly. Persons skilled in the art will appreciate that other temperature sensing devices such as digital thermometers, resistance temperature detectors (RTDs), infrared sensors, and other suitable devices can be used to either directly measure or indirectly infer rotor temperature.

Using the above described configuration of FIG. 5, the timing of the heating process may be controlled by electronics 560 as follows. The software in electronics 560 may use the monitored armature temperature to determine whether rotor 512 requires heating before beginning normal operation. If heating is required, then the software may calculate the preheat and settle times based on the monitored armature temperature. For example, if the monitored temperature is −20° C., then electronics 560 may instruct the preheating step to last ten hours and then instruct the settling step to run for five hours. If the initial measured temperature is 0° C., then electronics 560 may, for example, instruct the preheat step to run for seven hours and permit the rotor to settle for three hours before enabling normal operation. The duration of preheat and settle time may be determined based on the initial temperature reading of armature 544 because other factors (e.g., temperature versus time profile) such as those described above are known or incorporated into the software. Therefore, it may not be necessary to measure the armature temperature after the heating cycle begins.

The temperature measured on armature 544 may not necessarily be the same temperature exhibited by rotor 512 because the thermal time constants of the respective devices may not be the same. For example, the thermal time constant of rotor 512 may be much slower than the thermal time constant of the stator (e.g., armature 544). Thus, prior to flywheel device activation, the temperature of rotor 512 may not be the same as armature 544. Consequently, there may be instances when rotor 512 is much warmer than armature 544 and vice versa. This potential temperature difference, however, may not have an averse effect on the heating process because the typical operation of device 500 precludes such temperature differences from affecting the heating process. For example, during the shipment and/or installation of flywheel device 500, a sufficient period of time probably elapses such that the temperature difference between rotor 512 and armature 544 is negligible.

Furthermore, electronics 560 may include a timer that keeps track of how long device 500 is shut down (e.g., for maintenance). If the timer indicates that device 500 has been shut down for at least a predetermined period of time before reactivation, then device 500 may initiate the heating cycle if the armature temperature is low enough to warrant such action. If device 500 is inactive for a relatively short period of time (e.g., less then the timer limit), however, electronics 560 may not initiate the heating cycle because rotor 512 may still be at or near enough to a specified temperature despite the monitored armature temperature. Persons skilled in the art will appreciate that other factors may be used to determine how long device 500 can be shut down and not require rotor heating upon activation.

Figure 6:
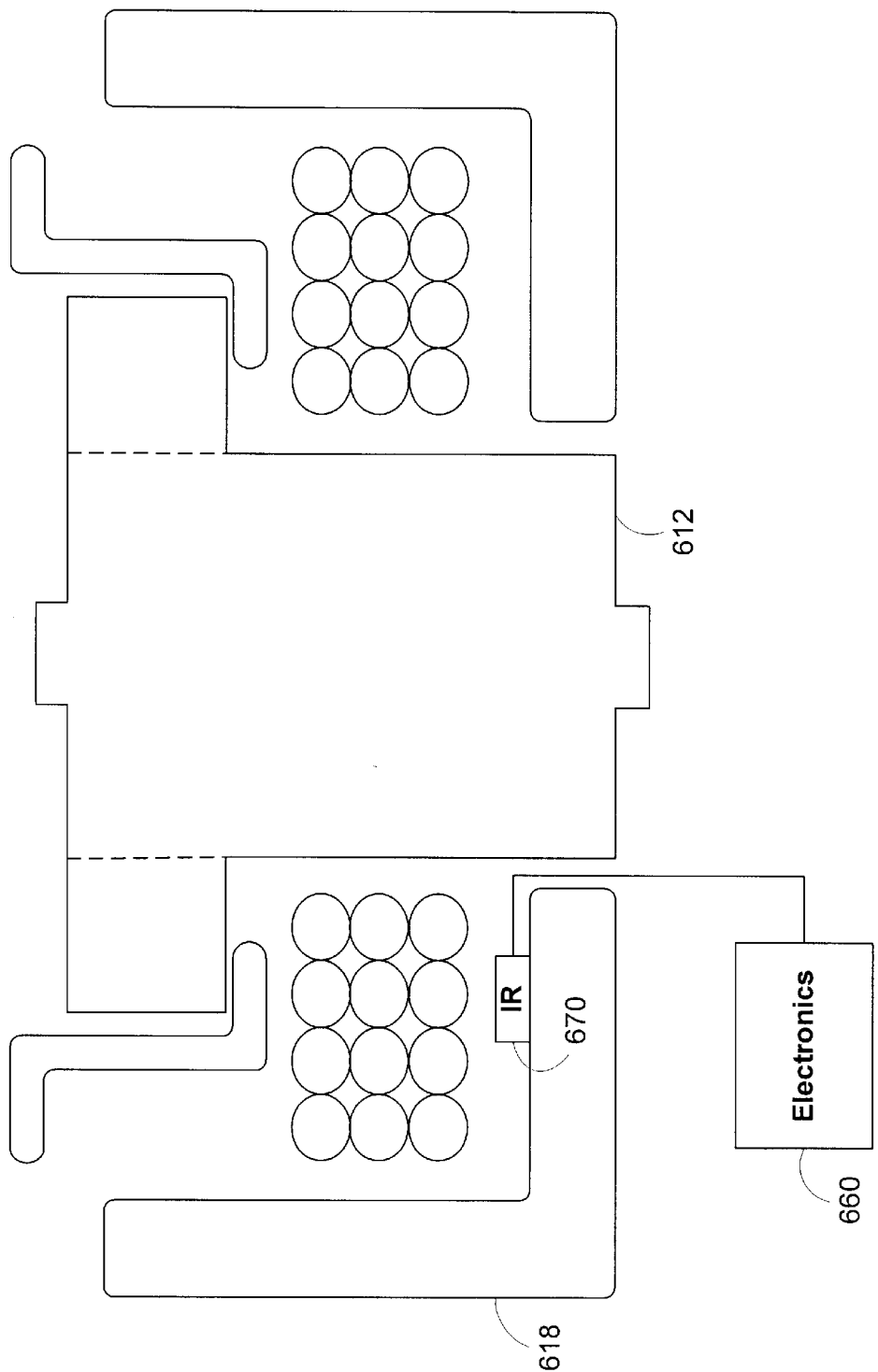
FIG. 6 illustrates an infrared detector configured to monitor the temperature of the rotor in accordance with the principles of the present invention.

Direct measurement techniques may also be implemented to determine the temperature of the rotor. FIG. 6 illustrates an infrared detector 670 that is configured to directly measure the temperature of rotor 612 in accordance with the principles of the present invention. Infrared detector 670 may be mounted on outer casing 618 as shown in FIG. 6 or in any other suitable position to monitor the rotor temperature. Direct rotor measurement may enable electronics 660 to make real-time adjustments to preheat and settle times. This may provide efficiency and minimize risk of potentially overheating rotor 612. Persons skilled in the art will appreciate that other devices can used to provide direct measurement of rotor 612. For example, a wireless thermocouple may be inserted into a hole bored into the rotor and transmit temperature data to electronics 660. Also, a direct contact thermocouple may be temporarily positioned against the rotor during the preheat process and then removed prior to commencing operation of the device and rotation of the rotor.

In an alternative embodiment, the temperature sensors of FIGS. 5 and 6 may be used to provide real-time temperature measurement to the electronics during preheating. Real-time measurement may enable the electronics to control preheating without having to determine a preheating and a settling step. In yet another embodiment, rotor temperature measurements may be taken in intervals.

Figure 7:
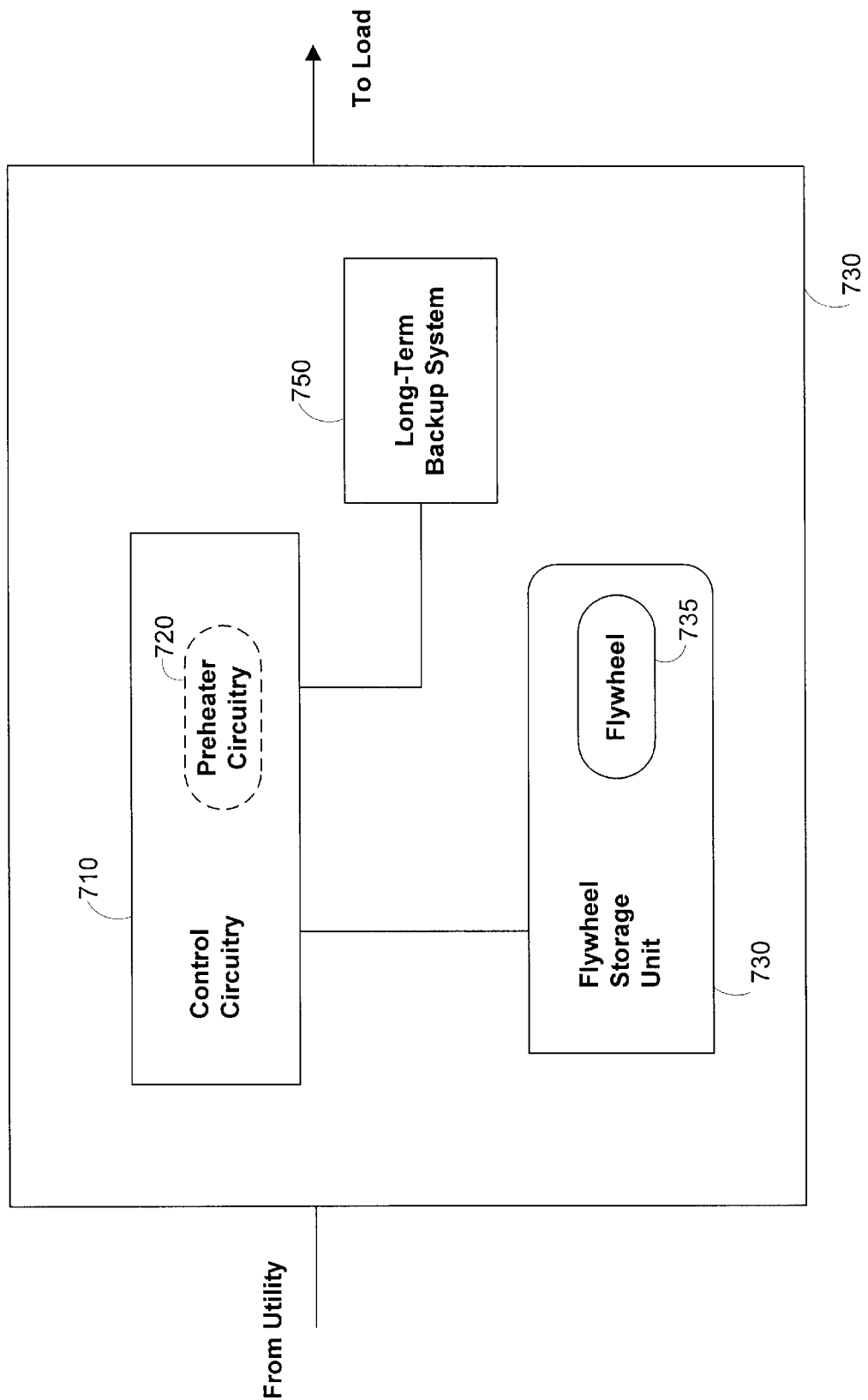
FIG. 7 is a schematic block diagram of an uninterruptible power supply system in accordance with the principles of the present invention.

FIG. 7 illustrates a representative example of how the principles of the present invention may be applied to provide an uninterruptible power supply system 700. System 700, which typically receives power from a utility, and provides power to a load, includes a flywheel storage unit 730 that may be any suitable type of flywheel energy storage device. Flywheel storage unit 730 may include flywheel 735 and other circuitry (not shown). System 700 also has control circuitry 710, which may provide various functions such as, for example, monitoring utility power provided to system 700, monitoring the power provided to the load, and controlling flywheel storage unit 730. Control circuitry 710 may be able to switch between a long term backup power system 750 and flywheel unit 730 whenever backup power is needed for a prolonged period of time. In addition, control circuitry 710 can control flywheel storage unit 730 such that unit 730 preheats flywheel 735 in accordance with the principles of the present invention.

Control circuitry 710 may include preheater circuitry 720, which may be suitable for controlling the method of preheating flywheel 735. Preheater circuitry 720 may have circuitry such as, for example, DC PWM converters, AC cycloconverters, and DC-AC inverters that provide high frequency current to flywheel storage unit 730. As mentioned above, the high frequency currents cause flux to radiate into flywheel 735, which induces current in the flywheel. The induced currents then generate heat in flywheel 735 to raise its temperature to a desired level.

Preheater circuitry 720 may also include software that takes part in controlling the preheating process. For example, before control circuitry 710 instructs flywheel storage unit 730 to operate, preheater circuitry 720 may take a reading from a temperature sensor to determine whether flywheel 735 requires preheating. If preheating is required, the software may calculate how long to induce current into the flywheel 735 based on a direct or inferred temperature reading of flywheel 735. In addition, the software may also determine a quantity of current to be provided to the armatures of flywheel energy unit 730.

Thus several techniques for preheating a rotor of a motor-generator system are provided. Persons skilled in the art will appreciate that the present invention can be practiced by other than the described embodiments, which are presented for purposes of illustration rather than of limitation, and the present invention is limited only by the claims that follow.

What is claimed is:

1. A method of utilizing circuitry of a motor-generator device to preheat a rotor, the method comprising:
    passing high frequency current through armature windings to induce current in portions of the rotor via magnetic induction;
    generating a substantially high concentration of heat in the portions of the rotor receiving the induced current; and
    diffusing the heat throughout the rotor such that the rotor temperature rises to a specified temperature.

2. The method defined in claim 1 further comprising indirect monitoring of the rotor temperature.

3. The method defined in claim 1 further comprising direct monitoring of the rotor temperature.

4. The method defined in claim 1 further comprising determining the time duration of magnetic induction based on a monitored rotor temperature.

5. The method defined in claim 1 further comprising determining the time duration of magnetic induction based on an inferred rotor temperature.

6. The method defined in claim 1, wherein the passing comprises controlling the high frequency current.

7. The method defined in claim 1 further comprising ceasing passing current to prevent overheating the rotor.

8. The method defined in claim 1 wherein the heat is diffused after said passing current ceases.

9. The method defined in claim 1 further comprising monitoring the time elapsed after the device shuts down to determine whether preheating is required upon reactivation.

10. The method defined in claim 1 further comprising operating the motor-generator device in a vacuum.

11. A motor-generator device having circuitry that enables use of magnetic induction to preheat a rotor, the device comprising:
    electronic circuitry that generates high frequency currents;
    a plurality of armature windings that emit flux when the high frequency currents pass through the armature windings; and
    a rotor that conducts current induced by the flux passing through the rotor, wherein the induced current raises the temperature of the rotor.

12. The device defined in claim 11 further comprising monitoring circuitry that monitors the temperature of the rotor.

13. The device defined in claim 12 wherein the monitoring circuitry is a temperature detection device selected from the group consisting of a thermocouple device, an infrared device, a thermometer device, a resistance temperature device, and a wireless thermocouple device.

14. The device defined in claim 12 wherein the monitoring circuitry provides data to the electronic circuitry that enables the electronic circuitry to determine how long to provide the high frequency currents to the armature windings.

15. The device defined in claim 11 wherein the electronic circuitry provides control of the high frequency currents.

16. The device defined in claim 11 wherein the rotor comprises a plurality of protrusions that conduct a substantial portion of the current induced in the rotor.

17. The device defined in claim 11 wherein the device operates in a vacuum.

18. The device defined in claim 11 wherein the electronic circuitry comprises software that determines how to safely heat the rotor to a specified temperature.

19. The device defined in claim 18 wherein the electronic circuitry comprises a timer that monitors the time elapsed after the device shuts down and enables the electronic circuitry to determine whether preheating is required upon reactivation.

20. An uninterruptible power supply system, comprising:
    a flywheel energy conversion device having a rotor;
    temperature sensing circuitry that provides a substantially accurate temperature reading of the rotor; and
    circuitry that provides a quantity of high frequency current to the flywheel energy conversion device to heat the rotor via magnetic induction, the quantity of current being based, at least in part, on the sensed temperature.

21. The system defined in claim 20, wherein the temperature sensing circuitry directly measures the temperature of the rotor.

22. The system defined in claim 20, wherein the temperature sensing circuitry indirectly measures the temperature of the rotor.

23. The system defined in claim 20, wherein the circuitry comprises converter circuitry selected from the group consisting of a DC pulsewidth modulator circuit converter, an AC cycloconverter, and an DC-AC inverter.

24. The system defined in claim 20, wherein the flywheel energy conversion device operates in a vacuum.

25. The system defined in claim 20, wherein the circuitry comprises software that determines how to safely heat the rotor to a specified temperature.

26. The system defined in claim 20, wherein the temperature sensing circuitry is a sensor selected from the group consisting of an infrared sensor, a resistor thermal detector sensor, a thermocouple sensor, and a wireless thermocouple sensor.

* * * * *